(12) United States Patent
Fukuda et al.

(10) Patent No.: US 9,222,808 B2
(45) Date of Patent: Dec. 29, 2015

(54) SCALE FOR ROTARY ENCODER, METHOD OF INJECTION-MOLDING SAME, AND ROTARY ENCODER USING SAME

(75) Inventors: Hideji Fukuda, Joyo (JP); Takuya Sunada, Suita (JP)

(73) Assignees: Kodenshi Corporation, Uji-shi (JP); Komatsulite Mfg. Co., Ltd., Suita-shi (JP)

( * ) Notice: Subject to any disclaimer, the term of this patent is extended or adjusted under 35 U.S.C. 154(b) by 128 days.

(21) Appl. No.: 14/124,673

(22) PCT Filed: Jun. 7, 2012

(86) PCT No.: PCT/JP2012/064675
§ 371 (c)(1),
(2), (4) Date: Dec. 6, 2013

(87) PCT Pub. No.: WO2012/169582
PCT Pub. Date: Dec. 13, 2012

(65) Prior Publication Data
US 2014/0091212 A1 Apr. 3, 2014

(30) Foreign Application Priority Data
Jun. 9, 2011 (JP) .................... 2011-129552

(51) Int. Cl.
*G01D 5/347* (2006.01)
(52) U.S. Cl.
CPC .......... *G01D 5/34707* (2013.01); *G01D 5/3473* (2013.01)
(58) Field of Classification Search
CPC .............. G01D 5/347; G01D 5/34707; G01D 5/34715; G01D 5/3473; G01D 5/34738; G01D 5/24438; G01D 5/24433; G01D 5/24428; G01D 5/24442
See application file for complete search history.

(56) References Cited

U.S. PATENT DOCUMENTS

| 4,644,156 A | 2/1987 | Takahashi et al. |
| 4,795,278 A * | 1/1989 | Hayashi ................... 384/448 |

(Continued)

FOREIGN PATENT DOCUMENTS

| CN | 201653438 U | 11/2010 |
| JP | 05203464 A | 8/1993 |
| JP | 2007178235 A | 7/2007 |

OTHER PUBLICATIONS

Japanese Patent Office, International Search Report of PCT/JP2012/064675, WIPO, Jul. 24, 2012, 1 page.

(Continued)

*Primary Examiner* — John Lee
(74) *Attorney, Agent, or Firm* — Alleman Hall McCoy Russell & Tuttle LLP

(57) ABSTRACT

In a radial optical path type rotary encoder, in order to be able to reduce deterioration of resolution and variation among products due to burrs during molding and/or rounding of a die, a scale for a rotary encoder is provided with a scale body which is formed substantially in a cylindrical shape, the scale body having a side surface portion in which a light transmitting portion through which light passes and a light blocking portion by which light with a predetermined width in a circumferential direction is blocked are formed alternately in the circumferential direction, wherein the side surface on a light-incident side of the light blocking portion is formed outside a light transmittable region having an outer edge defined by a light beam tangent to the side surface of the light blocking portion amidst the light passing through the light transmitting portion, in a lateral cross-section view.

8 Claims, 11 Drawing Sheets

(56) References Cited

U.S. PATENT DOCUMENTS

| | | | |
|---|---|---|---|
| 4,888,481 A * | 12/1989 | Kallin et al. | 250/231.13 |
| 4,940,937 A * | 7/1990 | Hattori | 324/207.22 |
| 6,144,027 A * | 11/2000 | Weber | 250/231.14 |
| 6,410,909 B1 * | 6/2002 | Rudolph et al. | 250/231.13 |
| 6,498,475 B2 * | 12/2002 | Foster et al. | 324/173 |
| 6,785,974 B2 * | 9/2004 | Sano | 33/1 PT |
| 7,150,103 B2 * | 12/2006 | Brandl et al. | 33/1 PT |
| 7,290,344 B2 * | 11/2007 | Brandl et al. | 33/1 PT |
| 7,969,856 B2 * | 6/2011 | Chang | 369/275.4 |
| 8,015,708 B2 * | 9/2011 | Song et al. | 29/894 |
| 8,460,137 B2 * | 6/2013 | Kajigaya et al. | 474/11 |
| 2004/0206894 A1 | 10/2004 | Oka et al. | |
| 2004/0256546 A1 * | 12/2004 | Hsiao et al. | 250/231.13 |
| 2005/0001156 A1 * | 1/2005 | Onishi et al. | 250/231.13 |
| 2006/0065414 A1 * | 3/2006 | Brandl et al. | 172/810 |
| 2006/0110885 A1 * | 5/2006 | Brandl et al. | 438/286 |
| 2006/0265875 A1 * | 11/2006 | Song et al. | 29/894 |
| 2007/0029470 A1 * | 2/2007 | Schroter et al. | 250/231.13 |
| 2007/0034786 A1 * | 2/2007 | Oka et al. | 250/231.13 |
| 2007/0047050 A1 * | 3/2007 | Igaki et al. | 359/224 |
| 2008/0054765 A1 * | 3/2008 | Siraky et al. | 310/68 B |
| 2008/0197729 A1 | 8/2008 | Igarashi | |
| 2014/0091212 A1 * | 4/2014 | Fukuda et al. | 250/231.1 |
| 2015/0008802 A1 * | 1/2015 | Fukuda | 310/68 B |

OTHER PUBLICATIONS

State Intellectual Property Office of the People's Republic of China, Office Action Issued in Application No. 201280027716.X, May 27, 2015, 6 pages.

* cited by examiner

SCALE FOR ROTARY ENCODER, METHOD OF INJECTION-MOLDING SAME, AND ROTARY ENCODER USING SAME

TECHNICAL FIELD

The present invention relates to a scale for use in a so-called radial direction type rotary encoder and a method of injection-molding the same.

BACKGROUND ART

As a rotary encoder for detecting a rotation angle of a motor, there are an axial direction optical path type one in which a flat, plate-shaped scale is fitted to a rotating shaft and an optical path between a light source and a light detector is set to the scale in the same direction as the rotating shaft, and a radial direction optical path type one in which a so-called drum type scale formed in a generally cylindrical shape with a slit formed in a side surface portion thereof is fitted to the rotating shaft and the optical path is set in the radial direction.

For example, in a compact motor for use in a household printer and the like, a volume needed to install a rotary encoder on the compact motor is desired to be made as small as possible. In such an application, also as shown in Patent Document 1 and the like, there is an advantage in a radial direction optical path type rotary encoder of having a benefit that an entire volume can be made small with ease.

However, in the radial direction optical path type rotary encoder, since the scale is generally cylindrically shaped with a slit formed in a side surface portion thereof, it is difficult to maintain accuracy compared to a case of forming a slit in a flat, plate-shaped scale and it is difficult to improve a resolution.

In more specific explanation, for example, in a case where a drum type scale is entirely formed of a resin by injection-molding, it is necessary to form the slits by arranging a plurality of thin column-shaped light blocking portions and light transmitting portions without anything formed and through which light passes as it is, alternately in a circumferential direction so that the side surface portion is comb tooth shaped. For example, in the case where burrs are generated in this light blocking portion at the time of molding, a quantity of light allowed to pass through the light transmitting portion is varied from a designed value or a quantity of light passable through each of the light transmitting portions is varied and this results in arising a problem that performance of the rotary encoder is hard to be stabilized in individual products.

Further, a die used for molding the resin scale is deteriorated because an edge portion in the vicinity that forms the light blocking portion or light transmitting portion becomes dull or the like when the injection-molding is repeated. In the case where deterioration such as dulling of the die occurs, new burrs which were not generated at an initial time of production are prone to generation and the light blocking portion is formed larger than the designed one, and therefore a quantity of light allowed to pass through the light transmitting portion is deviated from a designed value, which results in it being more difficult to maintain the performance such as a resolution.

In this way, in the case of drum type scales, since their shape is more complicated compared to a case of a flat, plate-shaped scale problems often occur such as burrs and the difficulty in maintaining accuracy due to deterioration of the die as mentioned above, and as a result problems occur such as the variation of performance of individual rotary encoders and difficulties with improvement of resolution of the rotary encoder itself.

CITATION LIST

Patent Document

Patent Document 1: JP-A2007-178235

SUMMARY OF INVENTION

Technical Problem

The present invention has been made in consideration of the above problems, being aimed at providing a scale for a rotary encoder made of resin in a radial optical path type rotary encoder, which is capable of reducing deterioration of resolution and variation among products caused by generation of burrs during molding and/or deterioration such as rounding of a die due to aged distortion and therefore the corresponding light blocking portion being formed larger than that at the time of designing, thereby maintaining accuracy with ease, and being aimed at providing a method of manufacturing the same.

Solution to Problem

Accordingly, a scale for a rotary encoder of the present invention includes a scale body which is formed substantially in a cylindrical shape or in a truncated conical shape, the scale body having a side surface portion in which a light transmitting portion through which light passes and a light blocking portion by which light with a predetermined width in a circumferential direction is blocked are formed alternately in the circumferential direction, wherein the side surface on an inner peripheral side or outer peripheral side of the light blocking portion is formed outside a light transmittable region having an outer edge defined by a light beam tangent to the side surface of the light blocking portion amidst the light passing through the light transmitting portion, as viewed in a lateral cross-section.

With this configuration, since the side surface on the inner peripheral side or outer peripheral side of the light blocking portion is formed outside the light transmittable region of the light passing through the light transmitting portion, even if there occur burrs in the inner peripheral side or outer peripheral side of the light blocking portion, the light incident to the light transmitting portion is not blocked since the burrs exist outside the light transmittable region. Therefore, the variation of performance such as resolution among products due to generation of burrs can be suppressed.

In addition, the scale for the rotary encoder of the present invention further includes a frame part formed with an axial bore to which a rotating shaft is fitted and includes the scale body, one end side of the side surface portion of the scale body is connected to the frame part, and a light source and a light detector are provided to be opposed inside and outside across the other end side of the side surface portion. The frame part and the scale body are molded of resin, the scale body having a side surface portion in which a light transmitting portion through which light passes and a light blocking portion by which light with a predetermined width in a circumferential direction is blocked are formed alternately in the circumferential direction, wherein the light blocking portion is formed so as to share a part of each radius inside a first imaginary fan-shape having a first central angle set based on the predetermined width with a center axis of the scale for the rotary encoder as a center point, as viewed in a lateral cross-section. As a part of the light blocking portion advances in a radial direction from a side of the light detector toward a side of the light source, a length dimension thereof in the circumferential direction becomes shorter and the part of the light blocking portion is molded of resin so as to be separated inwardly from each radius of the first imaginary fan-shape, as viewed in a lateral cross-section.

With this configuration, since the light blocking portion is formed so as to share a part of each radius inside the first imaginary fan-shape having the first central angle set based on the predetermined width with the center axis as the center point, as viewed in the lateral cross-section, and since as a part of the light blocking portion advances in the radial direction from the side of the light detector toward the side of the light source, the length dimension thereof in the circumferential direction becomes shorter and the part of the light blocking portion is molded of resin so as to be shorter than the length dimension of a circular arc of the first imaginary fan-shape, as viewed in the lateral cross-section, even if there occur burrs in the light source side of the light blocking portion, so long as the burrs are small in amount in a degree not exceeding the length dimension in the circumferential direction in the detector side, the light quantity passable through the light transmitting portion is not substantially changed and the variation in performance such as a resolution among the products due to generation of burrs can be suppressed. In other words, in the side in the light blocking portion closer to the light source, the width in the circumferential direction is set smaller and there exists a margin, therefore even if there is a greater or lesser mismatch with a shape of the light blocking portion at the time of designing due to burrs, it is possible to make it difficult to adversely affect the performance thereof.

In addition, even if the deterioration such as rounding is generated in a die due to aged distortion particularly in a portion where a light source side edge of the light blocking portion is formed and it becomes easy to generate burrs of new shapes and dimensions that were not generated at an initial manufacturing time, or even if a light source side edge vicinity of the light blocking portion is formed to be larger in the circumferential direction than a designed value as viewed in the lateral cross-section, the influences thereof can be tolerated similarly to the above effect and performance such as a resolution can be prevented from deterioration. That is, even if the die is continued to be used, the molding can be continued for a long time without hardly deteriorating a function of the scale for the rotary encoder and it is easy to continue maintaining accuracy.

Moreover, since the light blocking portion is to be formed thinner as it is closer to the light source, an irradiation angle of light allowed to pass to the light detector side through the light transmitting portion can be made wider compared to a case of making, for example, a width of the light blocking portion in the circumferential direction constant by molding as in the conventional case. And since the irradiation range of the light irradiated to the light detector side from the light source can be made wide, it becomes unnecessary to strictly manage the positional accuracy in the radial direction in the case of arranging the light source and light detector inside and outside the scale body so as to be assembled oppositely in order to constitute the rotary encoder. That is, since the light of an incident angle which could not pass through the scale body with the conventional light blocking portion becomes possible to pass through the light transmitting portion and the irradiation range can be provided widely, it is not necessary to increase the positional accuracy of the light source or light detector so highly, and there can be obtained further effects, different from the tolerance to the burrs, so that it becomes easy to improve the resolution and suppress the variation of performance among products.

As a more specific shape of the light blocking portion capable of facilitating attachment of the light source and light detector at a time of assembling the rotary encoder without deteriorating the performance such as resolution so much even if burrs are generated, it may be sufficient that the scale body is configured to have the light source provided inside and the light detector provided outside, that the light transmitting portion is an opening formed in the side surface portion, and that the light blocking portion is formed so as to share at least a part of each radius inside a second imaginary fan-shape having a second central angle set based on the predetermined width with a placing point of the light source as a center in a state of opposition to the light source, as viewed in a lateral cross-section.

As a specific shape capable of increasing a range irradiated by light emitted from the light source to the light detector side in the light blocking portion and suppressing the generation of burrs, it may be exemplified that the light blocking portion has a column shape in cross-section as viewed in a lateral cross-section extending from the one end side of the side surface portion of a substantially partially annular shape to the other end side, and the outside of the light blocking portion is formed to have a cut-corner shape or rounded-corner shape.

In order that the light blocking portion can be provided in the frame part with some degree of strength even if the light blocking portion is formed to be thinner in order to improve the resolution, it may be sufficient that the scale body further includes a rib for connecting the one end side of the light blocking portion with the frame part.

In order to further increase the strength by connecting a plurality of light blocking portions to one another, it may be exemplified that the scale body further includes an annular-shaped balustrade part for respectively connecting the other end sides of the plurality of the light blocking portions.

With a rotary encoder including: the scale for the rotary encoder of the present invention; a light source provided inside or outside the scale body; and a light detector provided so as to be opposed to the light source across the scale body, even if burrs at the time of manufacturing are generated, various aspects of performance such as resolution can be made stable and the rotary encoder can be appropriately used for control of a motor and the like.

As an injection-molding method in order that the length dimension in the circumferential direction among the light blocking portions is made short and that the burrs are mainly generated in the light source side where the influences of the burrs are hard to appear and the burrs are not generated in the light detector side so much to thereby suppress variation of passable light quantity due to the burrs and facilitate better stabilization of performance, there may be exemplified a manufacturing method of: using a die composed of a cavity formed with at least an outside shape of the light blocking portion and a core formed with at least an inside shape of the light blocking portion, the die being able to split in a central axis direction of the scale body; and setting so that the light transmitting portion is formed on a mating surface of the cavity and the core.

Advantageous Effects of Invention

Thus, according to the scale for the rotary encoder of the present invention and to the rotary encoder using the same, since the light source side of the light blocking portion has a width in the radial direction set smaller than the other portions and is molded of resin so as to become separated inwardly from each radius of the first imaginary fan-shape, even if burrs are generated in the light blocking portion at the time of injection-molding of the scale or there occurs deterioration such as rounding in the die due to aged distortion and the light source side is formed larger, the variation among the individual productions can be made small while keeping high performance such as resolution almost without a change of light quantity passing through the light transmitting portion. Moreover, since the incident angle of the light passable through the scale from the light source can be made larger than the conventional one, the performance such as resolution can be retained without performing a positional alignment strictly in the circumferential direction of the light source and light detector also at the time of assembling the light source and light detector to the scale to configure the rotary encoder. Therefore, the assembly of the rotary encoder can be performed very simply.

REFERENCE CHARACTER LIST

Figure 1:
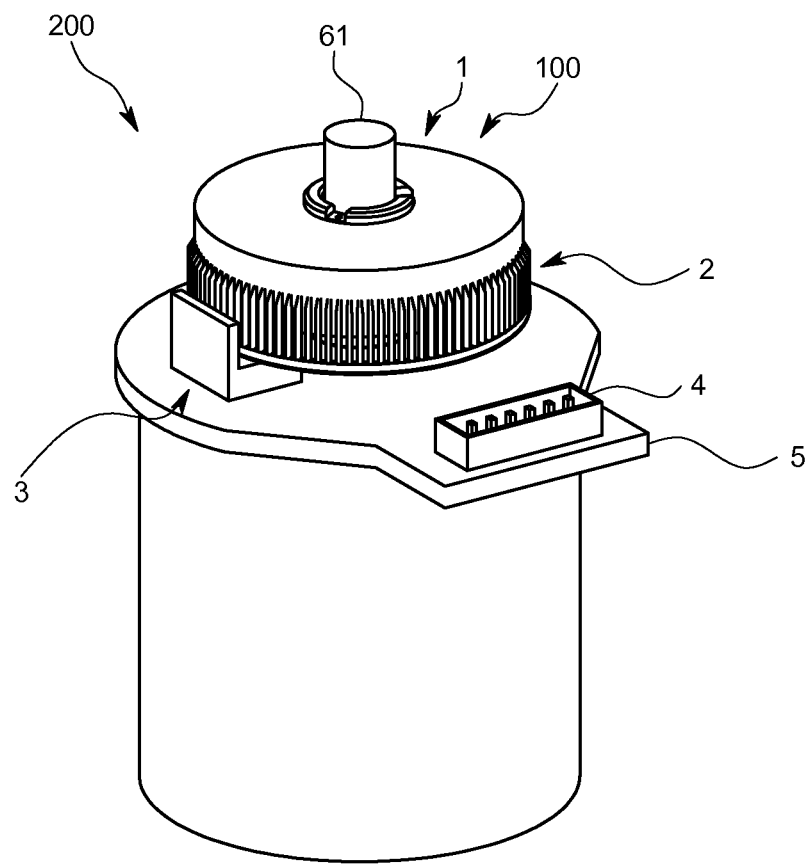
FIGS. 1(a) and (b) are schematic diagrams showing a usage state of a scale for a rotary encoder pertaining to one embodiment of the present invention.
Figure 1:
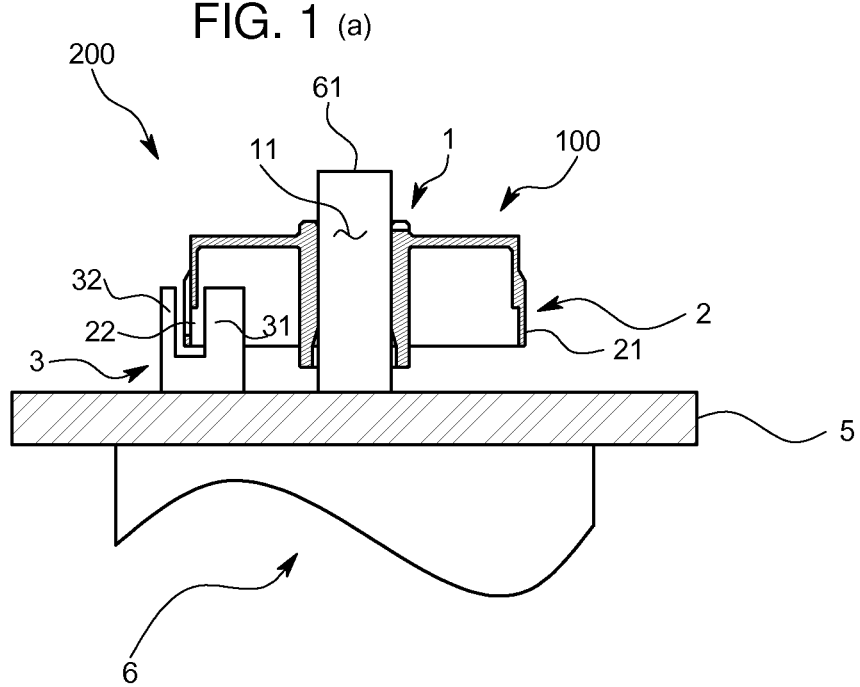

200 . . . Rotary encoder
100 . . . Scale for rotary encoder
1 . . . Frame part
2 . . . Scale body
21 . . . Light blocking portion
22 . . . Light transmitting portion
23 . . . Rib
24 . . . Balustrade part
31 . . . Light source
32 . . . Light detector
D1 . . . First imaginary fan-shape
D2 . . . Second imaginary fan-shape
7 . . . Die
71 . . . Cavity
72 . . . Core
81 . . . Mating surface
82 . . . Parting line
R . . . Light transmittable region
R1, R2 . . . Light beam

DESCRIPTION OF EMBODIMENTS

The following describes one embodiment of the present invention referring to the drawings.

A scale 100 for a rotary encoder and a rotary encoder 200 of the present embodiment are used for detecting a rotation angle of, for example, a compact motor 6 of a printer, home electronic, or the like, and can be appropriately used for, in particular, one having a limited capacity of accommodating each piece of equipment inside thereof.

FIG. 1(a) shows a state of the rotary encoder 200 being attached to the compact motor 6 in a perspective view. The scale 100 for the rotary encoder is generally flat and cylindrically shaped as a whole with its bottom surface opened and an upper surface side fitted with an output shaft of the motor 6 and is attached so that the bottom surface thereof faces a main body side of the motor 6. In addition, the scale 100 for the rotary encoder is entirely formed of resin. Further, as shown in the perspective view of FIG. 1(a), between the scale 100 and the main body of the motor 6, there are attached a terminal 4 for taking out various signals, a detection unit 3 for detecting a rotation angle from the scale 100, and a wiring board 5 to be wired. The detection unit 3 has a side surface of a generally U shape and is provided so that a light source 31 and a light detector 32 are opposite at its tip ends. And, as shown in FIG. 1(b), the detection unit 3 is attached so that the side surface of the scale 100 enters between the tip ends of the detection unit 3 to thereby configure the rotary encoder 200. Pulses detected by this detection unit 3 are outputted from the terminal 4 and the rotation angle of the motor 6 is calculated based on the number of pulses.

The following describes in detail the scale 100 for the rotary encoder.

As shown in a cross-section view of FIG. 1(b), the scale 100 for the rotary encoder is composed of; a frame part 1 which mainly configures an upper surface portion and is fitted to a rotating shaft 61 of the motor 6; and a scale body 2 which mainly configures a side surface portion and in which a slit is formed, and these are configured of resin by integrally molding.

Figure 2A:
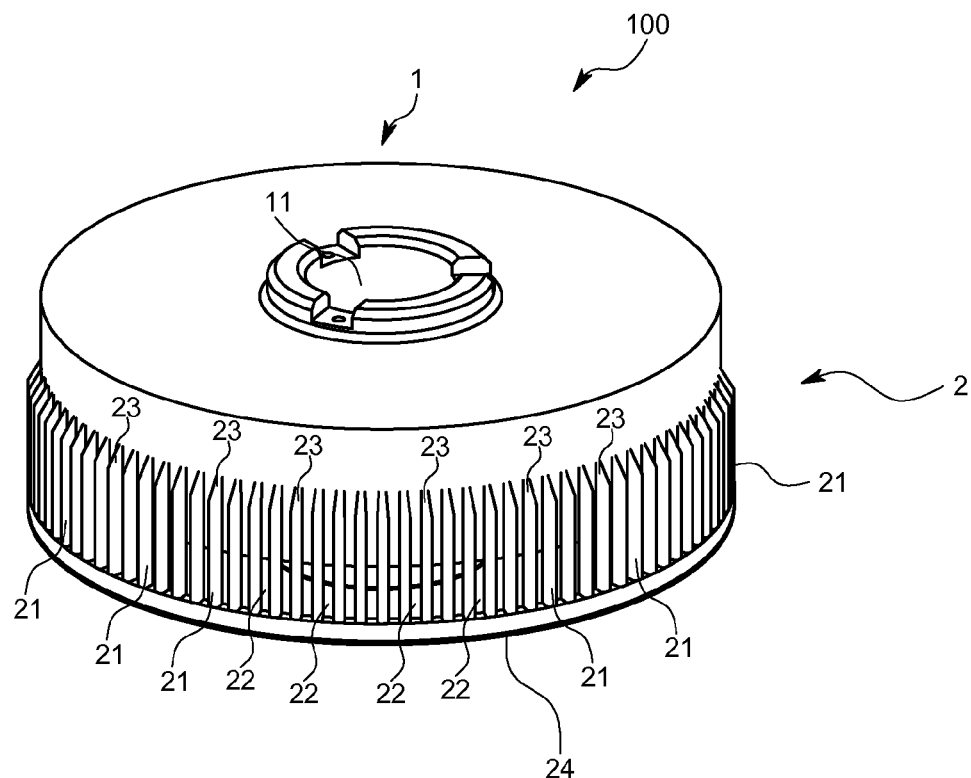
FIGS. 2(a) and (b) are schematic diagrams showing detail of the scale for the rotary encoder in the same embodiment.

As shown in the cross-section view of FIG. 1(b) and perspective view of FIG. 2(a), the frame part 1 is flat plate shaped with its upper portion having a through hole at a center thereof and is shaped with a cylinder vertically protruded from the center portion to a lower side. The inside of the through hole and a cylindrical portion is a shaft hole 11 to which the rotating shaft 61 of the motor 6 is fitted. Three round convex portions formed on the upper surface are gate traces formed by pouring the resin into a die from a runner at a time of injection-molding.

As shown in the perspective view of FIG. 2(a), the scale body 2 is generally cylindrically shaped with the rotating shaft 61 as a central axis 61 thereof, and one end side of the side surface portion, i.e., an upper side in the present embodiment, is integrally molded so as to be connected to the side surface of the frame part 1. In addition, as shown in FIG. 1, on the lower side that is the other end side of the side surface portion of the scale 2, the light source 31 and light detector 32 are provided inside and outside so as to be opposite across the other end side of the side surface portion. It is noted that, in the present embodiment, the light source 31 is provided inside and the light detector 32 is provided outside. The side surface portion of this scale body 2 is provided with a plurality of light transmitting portions 22 highlighted by hatchings in a side perspective enlarged view of FIG. 2(*b*) through which light passes and light blocking portions 21 by which light with a predetermined width in the circumferential direction is blocked, wherein the light transmitting portions 22 and light blocking portions 21 are alternately formed in the circumferential direction. Here, as the predetermined width, there can be exemplified a length in the circumferential direction of a shadow which is desired to be formed on the light detector 32.

Figure 2B:
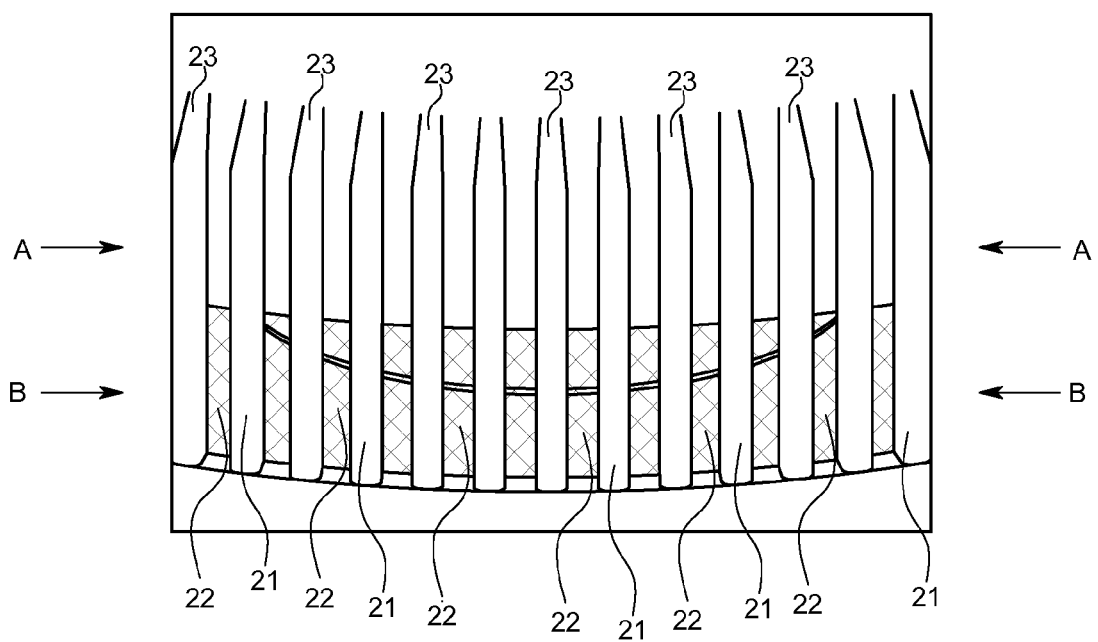

As shown in FIG. 2(*b*), the light transmitting portions 22 and light blocking portions 21 are formed to be line shaped, extending in an axial direction of the rotating shaft 61 in a side view, and each light transmitting portion 22 is formed as an open window and each light blocking portion 21 is formed of-resin to have a column shape. In other words, by standing the column shaped light blocking portions 21 in an arrangement of spaces left substantially corresponding to a length dimension in the circumferential direction, an annular comb tooth shape is formed. Further, as shown in FIG. 2(*b*), this scale body 2 has ribs 23 respectively formed on the upper portions of the light blocking portions 21 in order to strengthen the connection with the frame part 1, and further, in order to maintain the strength of each of the light blocking portions 21, an annular balustrade part 24 is formed by connecting the bottom surface of each of the light blocking portions 21. Thus, as shown in FIG. 2(*c*), a step D is formed in a radial direction between the side surface of the frame part 1 and the light blocking portion 21 of the scale body 2 for a purpose that the light blocking portion 21 may facilitate being removed from a die at a time of injection-molding. A margin of the above is provided in a side surface in a side where such a step D is formed in each of the light blocking portions 21 according to a structure of the die used for injection-molding the scale body 2 to be described later. The step D can be also formed between the light blocking portion 21 and the balustrade part 24, similarly. In addition, each of the ribs 23 has a tapered shape compared to the light blocking portion 21 is for a purpose that a resin flow to the light blocking portion 21 may be made smoother at a time of filling the resin and a contact area of the scale body 2 formed to have a comb tooth shape with the die is made as small as possible at a time of mold release to thereby facilitate the mold release.

Next, the following describes in detail the shape of the light blocking portion 21.

Figure 3A:
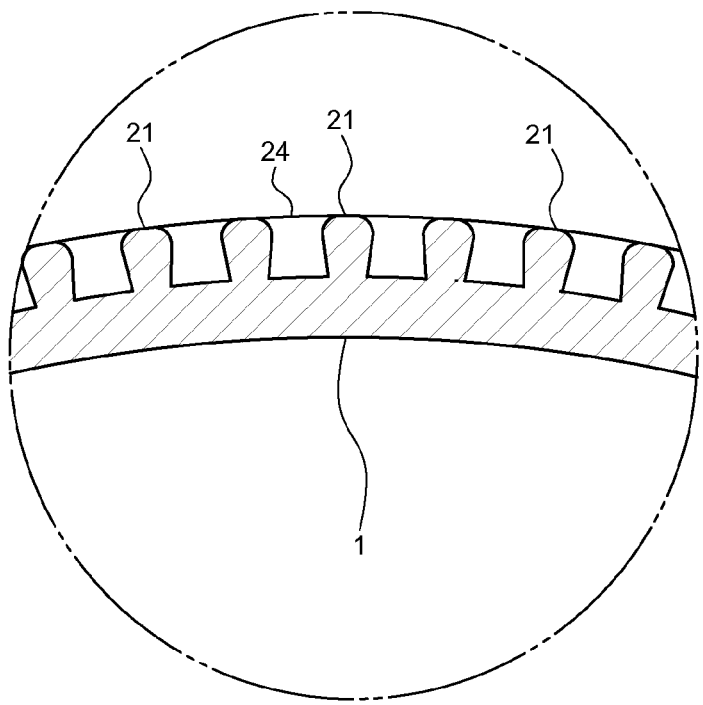
FIGS. 3(a)-(c) are schematic diagrams showing a lateral cross-section shape of a light blocking portion in the same embodiment.
Figure 3B:
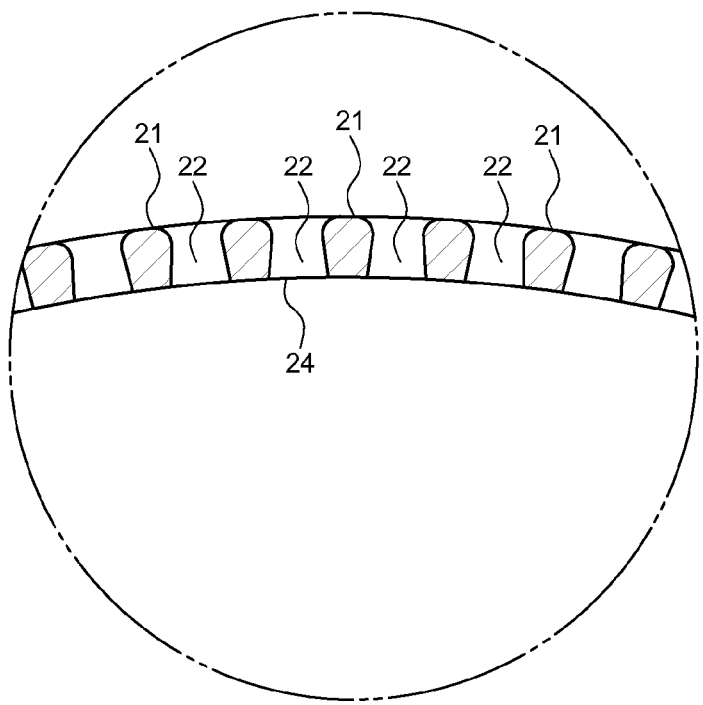
Figure 3C:
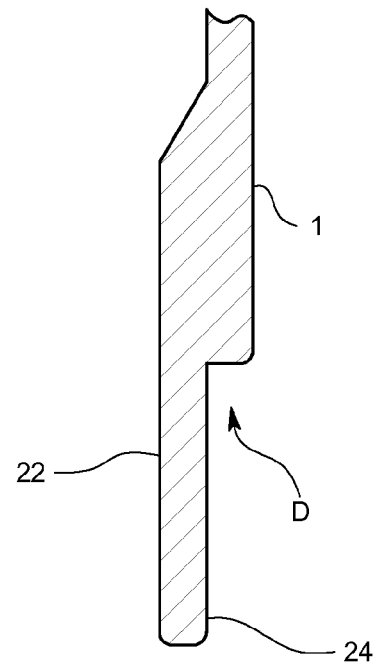

The light blocking portion 21 has a column shape extending in the axial direction and has a specific feature in a lateral cross-sectional shape as shown in FIG. 3(*a*) which is a lateral cross-section view along an A-A line in FIG. 2(*b*) and FIG. 3(*b*) which is a lateral cross-section view along a B-B line in FIG. 2(*b*). That is, the light blocking portion 21 is molded of resin and formed to have a generally partial annular shape in a manner that at least a partial portion thereof has a length dimension in the circumferential direction which becomes smaller and become separated inwardly from each radius of the first imaginary fan-shape D1 as it advances from the outside (a side of the light detector 32) toward the inside (a side of the light source 31) in the lateral cross-section view. More specifically, in the lateral cross-section of the light blocking portion 21, the outside is formed to have a rounded-corner shape and the inside thereof is formed to have a corner. In addition, as the length dimension in the circumferential direction of the light blocking portion 21 is viewed from the outside to the inside in the radial direction, it is so configured that the circumferential length dimension is zero at the outermost extent in the radial direction, then gradually increases and becomes maximum at the middle part, and thereafter the length dimension in the circumferential direction monotonically decreases up to the innermost extent in the radial direction.

The following describes in detail the shape of the light blocking portion 21 from the middle part to the inside in the lateral cross-section.

Figure 4:
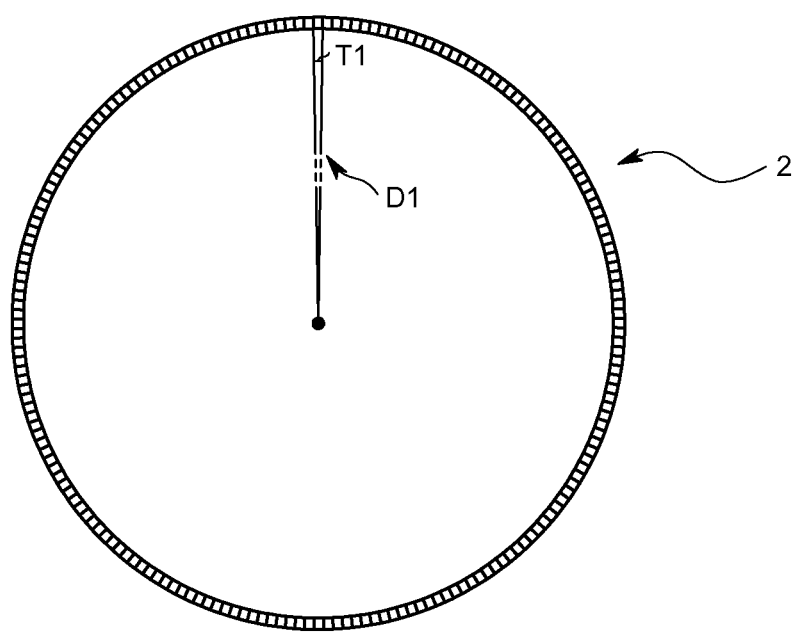
FIGS. 4(a) and (b) are schematic diagrams explaining a length dimension in a lateral cross-section of the light blocking portion in the same embodiment.
Figure 4:
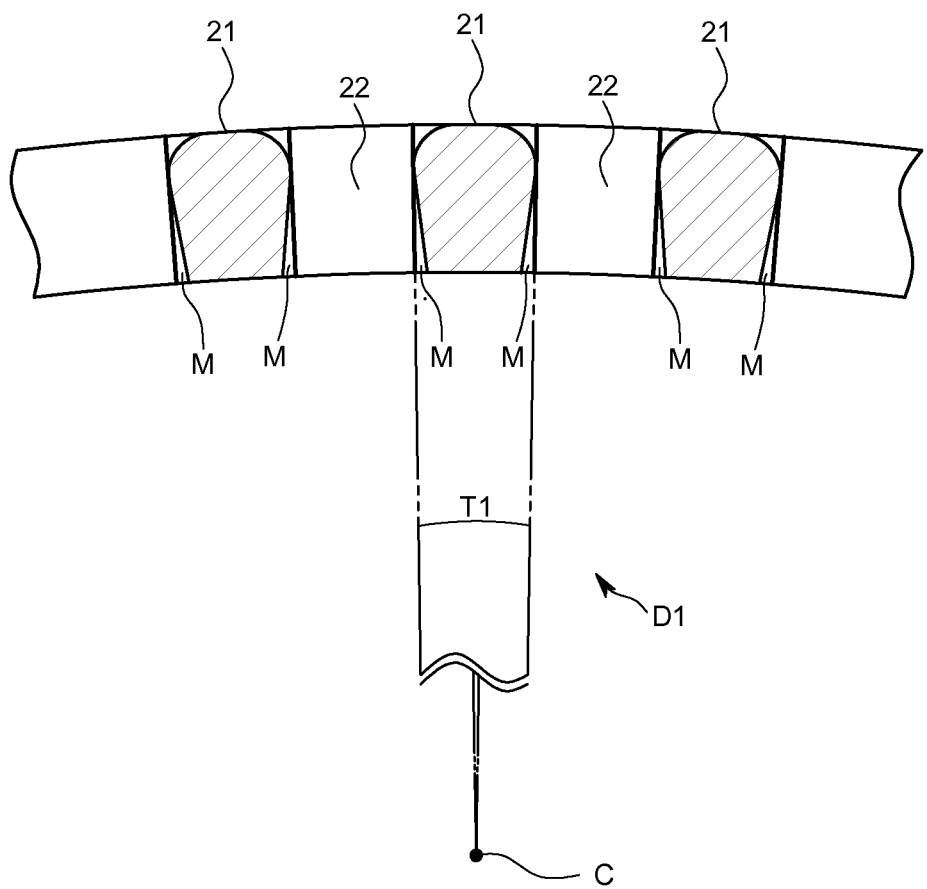

As to the length dimension of the light blocking portion 21 in the circumferential direction, a thinning method has been defined based on the predetermined width in the circumferential direction to block the light to the light detector 32. More specifically, the light blocking portion 21 is an imaginary fan-shape as shown by an imaginary line in FIGS. 4(*a*) and 4(*b*) and is formed so as to share at least a partial portion of each radius inside a first imaginary fan-shape D1 having a first central angle T1 that is set based on the predetermined width with the center shaft 61 as a center point C in a lateral cross-section view. That is, in an enlarged view of FIG. 4(*b*), it is formed to be thinner as it advances inwardly in the radial direction from a middle part so as to reside within a radius which is circumscribing in the circumferential direction of the light blocking portion 21 as shown by a bold line. Here, as a specific example of a method of determining the central angle T1, there can be exemplified such a method that it is determined by a fan-shape having a circular arc length of a light blocking width using a straight line connecting the center point C and the light detector 32 as the radius and a placing point of the light detector 32 as a center.

Figure 5:
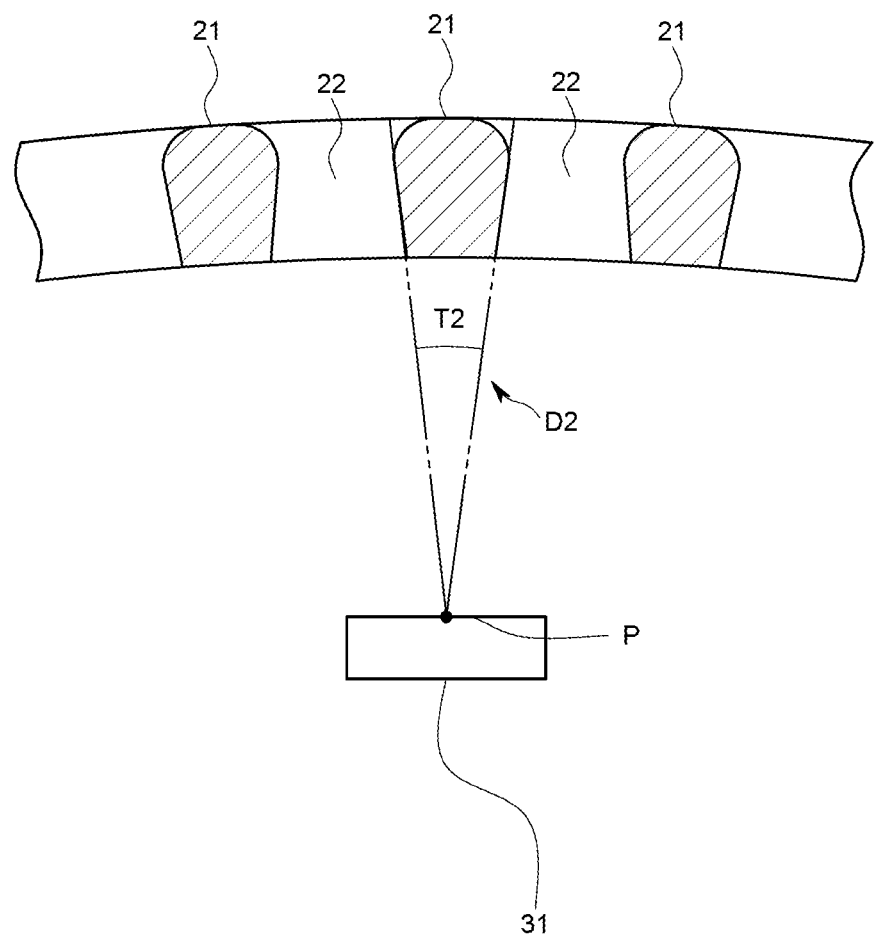
FIG. 5 is another schematic diagram explaining a length dimension in a lateral cross-section of the light blocking portion in the same embodiment.

Further, as another condition in the present embodiment, in a lateral cross-section view in a condition that the light blocking portion 21 and the light source 31 are opposite, i.e., in the condition that the placing point of the light source 31 and the center line extending in the radial direction of the light blocking portion 21 are aligned on the radius extending from the center shaft 61, the light blocking portion 21 is formed so as to share at least a part of each radius inside a second imaginary fan-shape D2 having a second central angle T2 which is set based on the predetermined width using the placing point P of the light source 31 as the center as shown in FIG. 5. In other words, the cross-section of the light blocking portion 21 is rendered to be included within the second imaginary fan-shape D2 capable of drawing a straight line from the placing point so as to be circumscribed with a portion having the maximum width capable of blocking light with the predetermined width in the lateral cross-section view.

The following describes an effect of making the shape as described above in the lateral cross section of the light blocking portion 21 In the following explanation using FIG. 6, the light beams emitted from the light source 31 are described so as to be represented by parallel light beams for brevity. In the case of the conventional light blocking portion 21 having a generally constant width in the lateral cross-section as shown in FIG. 6(*a*), when burrs B are generated, blocked components are inevitably generated and therefore a quantity of light detectable by the light detector 32 is lowered, which results in an occurrence of a bad influence on detecting in a rotation angle.

Figure 6:
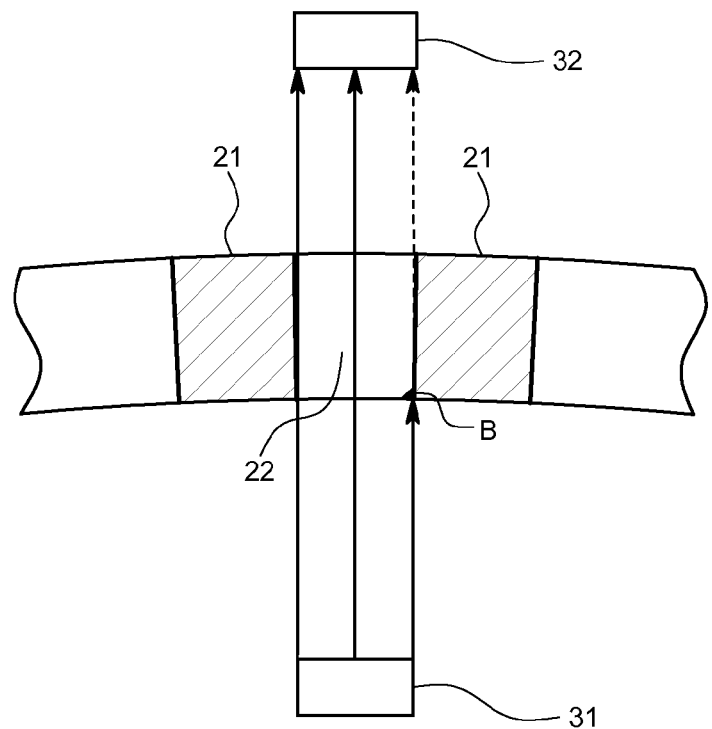
FIGS. 6(a) and (b) are schematic diagrams showing a passing-through light quantity at a time of burr generation in the same embodiment.
Figure 6B:
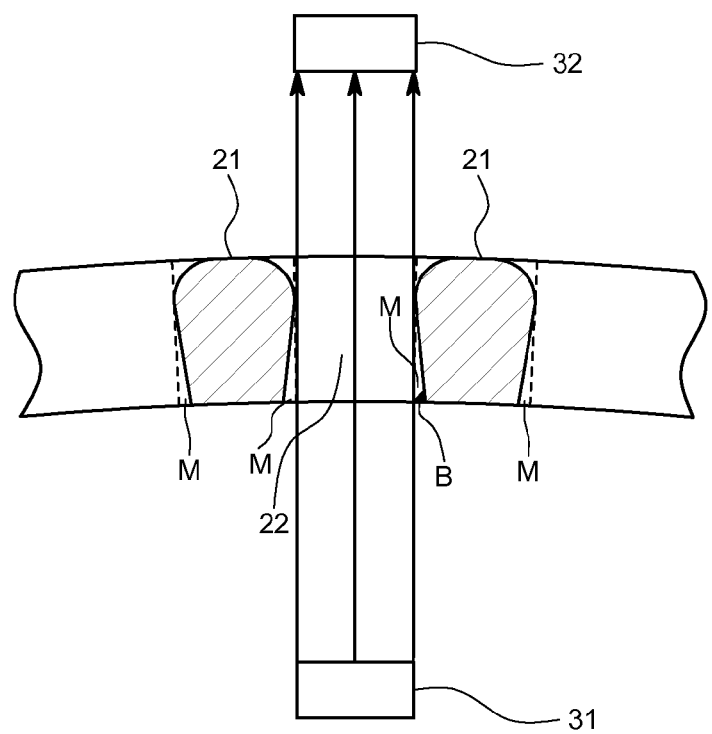

Meanwhile, with the shape of the light blocking portion 21 of the present invention as shown in FIG. 6(*b*), even if there are generated burrs B inside, the light from the light source 31 is not blocked because the margin M exists and the quantity of the light detectable by the light detector 32 is easily prevented from lowering. That is, since the light blocking portion 21 has a tolerance against the burrs B, deterioration of the performance such as a resolution of detecting a rotation angle is prevented and variations of the performance among products can be easily prevented. Further, this margin M similarly functions also in the case where there occurs deterioration such as dullness due to aged distortions in the die for injection-molding the scale 100 for the rotary encoder to be described later and there are generated the burrs B with characteristics which have not appeared at an initial time of production or in the case where the length dimension in the circumferential direction in the side of the light source 31 of the light blocking portion 21 becomes molded larger than the designed value. That is, even if there occurs deterioration of the die due to repetition of the injection-molding of the scale 100 for the rotary encoder, each performance such as a resolution is prevented from largely lowering even compared to ones produced at an initial time and the accuracy as the rotary encoder 200 can be easily kept.

Further, the following describes an effect obtained by reducing the length dimension in the circumferential direction from the maximum size in the outside from the middle part in the radial direction in the lateral cross-section of the light blocking portion 21.

Figure 7:
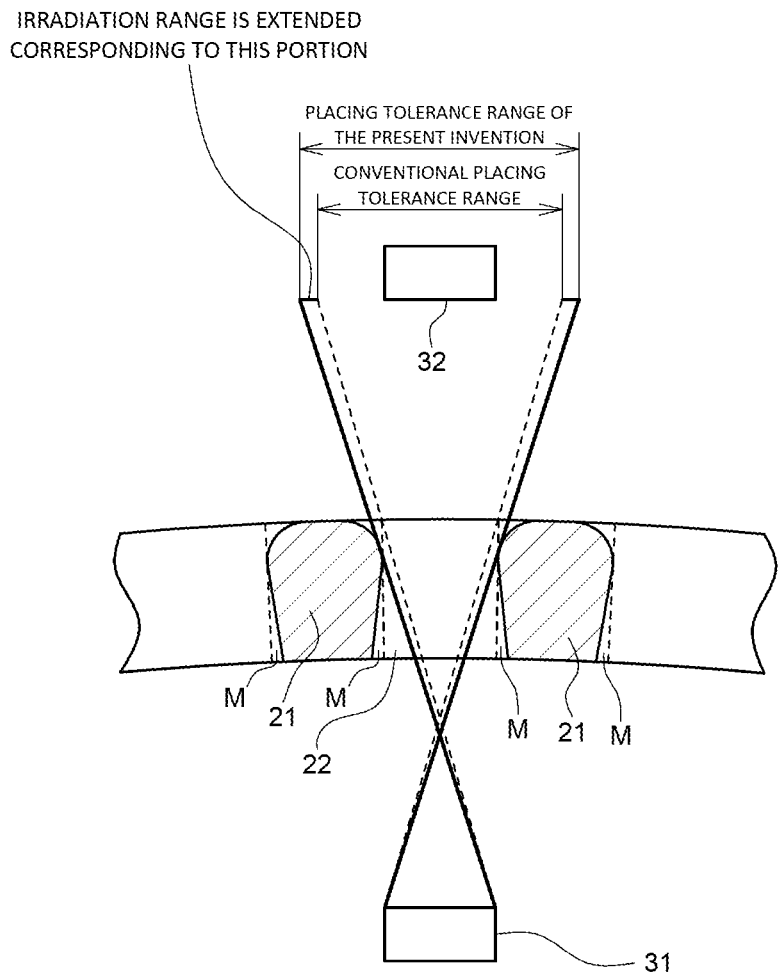
FIG. 7 is a schematic diagram showing a tolerance at a time of assembly of the rotary encoder in the same embodiment.

As shown in FIG. 7, with the shape of the conventional light blocking portion 21 shown by a dotted line, although only light beams of an incident angle shown by a dotted line reach the side of the light detector 32, with the shape of the present embodiment, it is possible to render the light of an incident angle in a wider range as shown by a solid line to reach the side of the light detector 32. Therefore, since an irradiation range in the side of the light detector 32 becomes wider than conventional, the range where the light detector 32 is installed and receives the predetermined quantity of light enough to output a signal or more becomes wider. Therefore, even if the positional accuracy of the light detector 32 at the time of assembly is not managed so strictly, it becomes possible to exhibit the predetermined performance to thereby improve productivity. This effect becomes remarkable especially in the case where the detection unit 3 is an emission-light typed one.

Finally, the following describes a manufacturing method of the scale 100 for the rotary encoder of the present embodiment.

Figure 8:
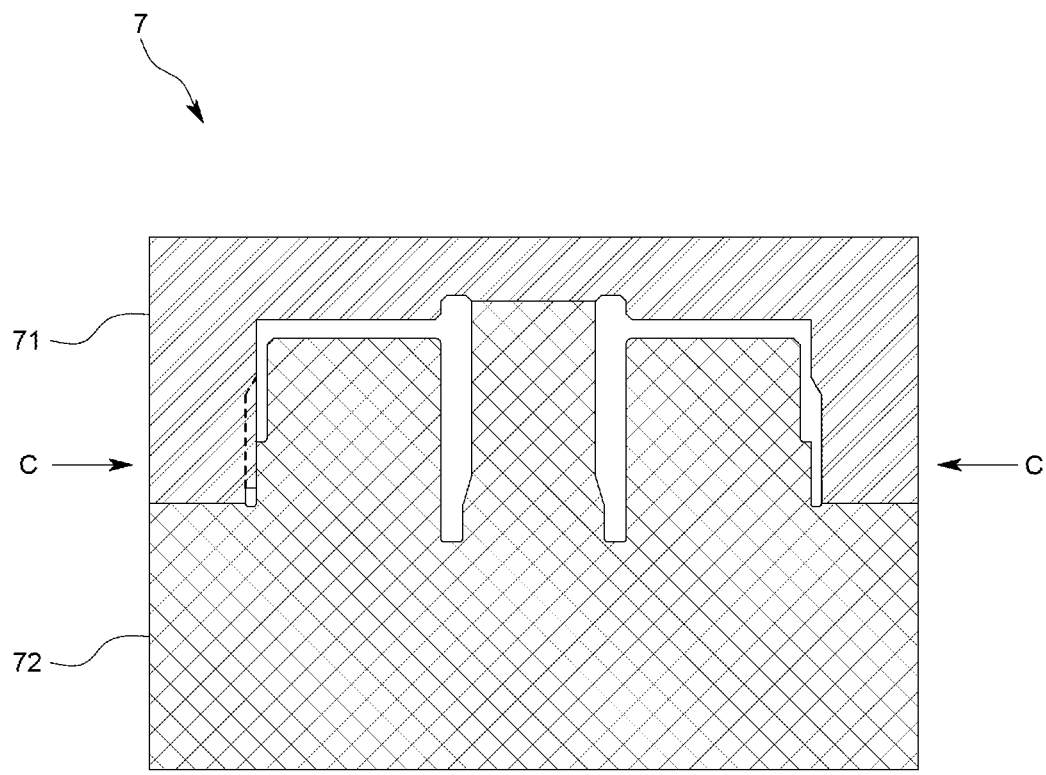
FIG. 8 is a schematic cross-section view showing a die used in manufacturing the rotary encoder of the same embodiment.

As shown in FIG. 8, the scale 100 for the rotary encoder of the present embodiment is manufactured by injection-molding using the die 7 which is composed of a cavity 71 forming at least an outer shape of the light blocking portion 21 and a core 72 forming at least an inner shape of the light blocking portion 21 and which is dividable in the direction of the center shaft 61 of the scale body 2. That is, since the cavity 71 is used as a female mold and the core 72 is used as an upper side, the scale 100 for the rotary encoder shown in FIGS. 1 and 2 etc. results in being formed in the reverse direction.

Figure 9:
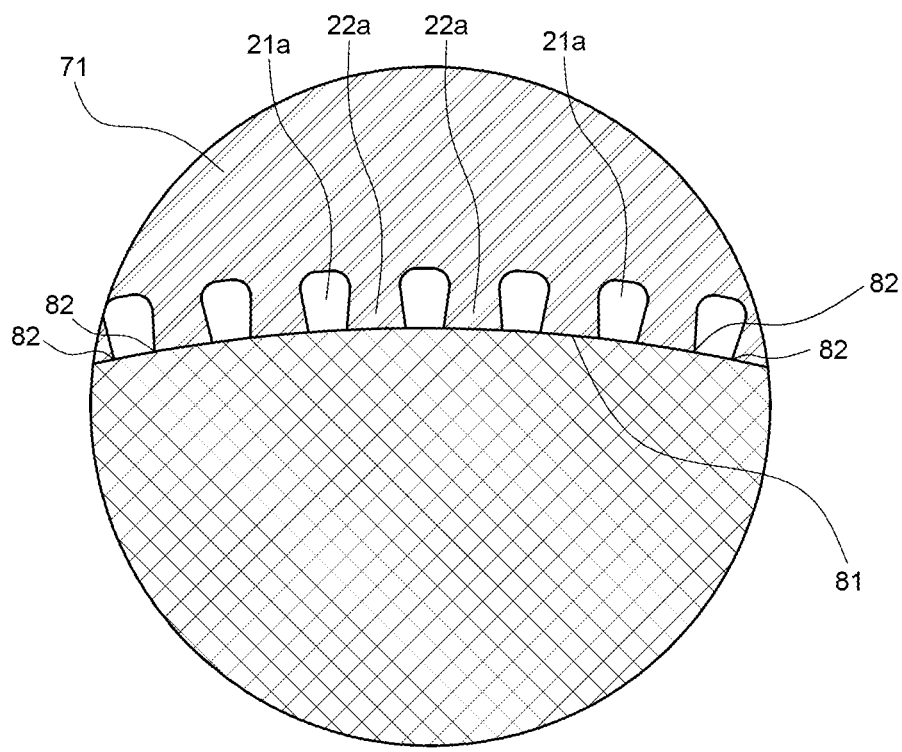
FIG. 9 is a schematic cross-section view showing a mating surface of a cavity and core where peripheries of the light blocking portion and light transmitting portion are formed and a parting line in the same embodiment.

FIG. 9 shows a schematic view enlarging the vicinity of the light blocking portion 21 and light transmitting portion 22 to be formed in the lateral cross-section along a line C-C in FIG. 8. In this FIG. 9, places where the light blocking portions 21 and light transmitting portions 22 are formed by the cavity 71 and core 72 are shown by reference numerals 21a and 22a, respectively. Referring to a specific feature point of this die 7, it is in a point of setting so that, as shown in FIG. 9, the light transmitting portions 22 are formed on a mating surface 81 of the cavity 71 and the core 72 and a parting line 82 is formed on a boundary between the light transmitting portions 22 and the inner edge portions of the light blocking portions 21. In this way, since the parting line 82 which has a comparatively high possibility of occurrence of the burrs B is formed between the light transmitting portions 22 and the inner edge portions of the light blocking portions 21, the burrs B can be collected on the inner edges of the light blocking portions 21 where they are scarcely affected even if the burrs B are generated as shown in FIG. 6. In other words, even if the burrs B of different shapes in respective products are generated, the occurrence positions thereof are collected on the inner edge portions of the light blocking portions 21 where there is little affected on the performance, whereby the variations of the performance among the respective products can be suppressed.

The following describes the other embodiments.

In the embodiment described above, although an application example for a motor of a printer is shown as an application example of the scale and rotary encoder of the present invention, the present invention may be used for another positioning device or a paper feeder. The point is that the present invention can be adapted to such an application as of obtaining a rotation angle from a detection revolution number detected by an encoder and an application of obtaining a movement distance from a revolution number to perform positioning and the like. In reverse, it is also possible to perform measurement by obtaining a detection revolution number from a movement distance or rotation angle.

In the embodiment described above, although the scale body is generally cylindrically shaped, it may have, for example, a truncated cone shape extending outwardly from the frame body. Further, the widths of the light transmitting portion and light blocking portion in the circumferential direction need not be the same degree of width. For example, the width of the light transmitting portion may be greater or smaller than that of the light blocking portion. Moreover, the light transmitting portion or light blocking portion does not extend in the center axis direction in a side view but it may be formed to be, for example, slanted to the center axis direction. In addition, in the embodiment described above, although the light source is provided inside the scale and the light detector is provided outside the scale, this relationship may be reversed. At this time, also the shape in the lateral cross-section of the light blocking portion is similarly reversed to the above embodiment, whereby the same effect can be obtained.

Figure 10:
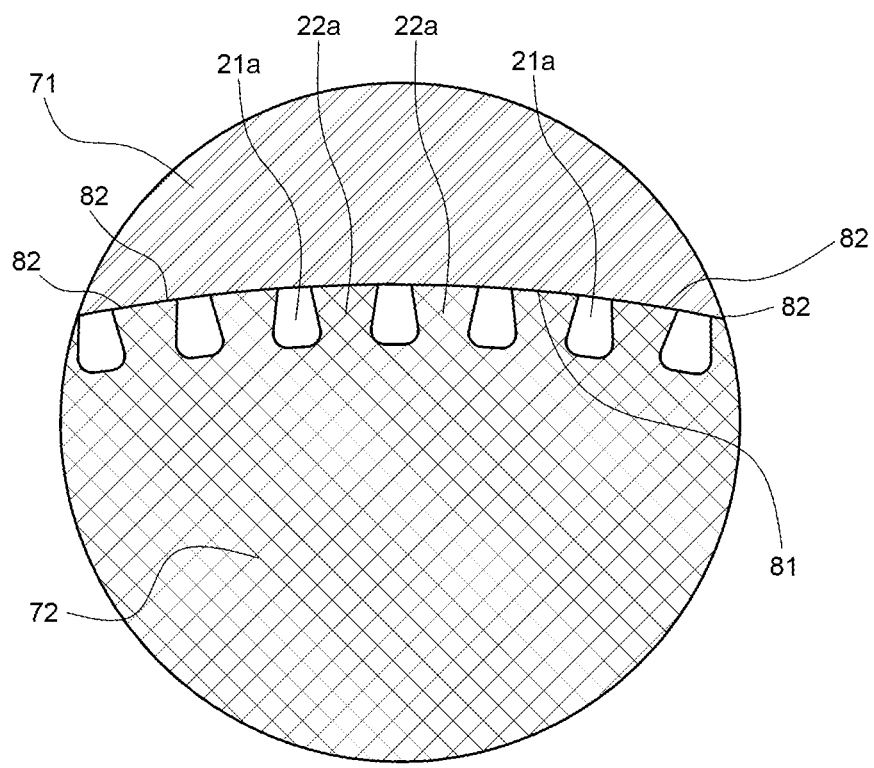
FIG. 10 is a schematic cross-section view showing a mating surface of a cavity and core and a parting line in a die for injection-molding a scale for a rotary encoder pertaining to another embodiment of the present invention.

In the above embodiment, the outside of the light blocking portion may not be of a rounded-corner shape but may be of a cut-corner shape. Also, the inside of the light blocking portion may be of a corner-round shape. Further, as shown in FIG. 10, the mating surface 81 is not formed on the inner edges of the light blocking portions 21 but may be formed on the outer edges of the light blocking portions 21. That is, the parting line 82 is to be formed outside the light blocking portions 21 as shown in FIG. 10. In addition, the way of taking the mating surface and parting line is not limited to that shown in FIGS. 9 and 10 but, for example, may be formed in the middle part of the light blocking portions 21.

Further, the outer edge is not of a corner-round shape and the like as the light blocking portion 21 formed with a cavity shown by a reference numeral 21a as shown in FIG. 10 but may be formed into a corner. Moreover, the corner is not formed at the inner edge of the light blocking portion 21 but a corner-round shape may be formed. In the embodiment described above, although the ribs and balustrade part are formed for increasing the strength, these need not be provided according to the shapes. In addition, the rotary encode is not limited to only detect a rotation angle of the motor but may be used for detecting a rotation angle of a rotating shaft of the others.

Further, regarding the light blocking portion 21, it is sufficient that the inner peripheral side or outer peripheral side surface of the light blocking portion 21 may be formed outside a light transmittable region R having an outer edge defined by light beams R1 and R2 tangent to the side surface of the light blocking portion 21 amidst the light passing through the light transmitting portion 22, in a lateral cross-section view. More specifically, as shown in FIG. 11, in a state that the light source 31 and the light transmitting portion 22 are opposite, the light transmittable region R is defined by the light beams R1 and R2 tangent to the light blocking portion 21 which is adjacent to the light transmitting portion 22 amidst the light emitted from each point of the light source 31.

Figure 11:
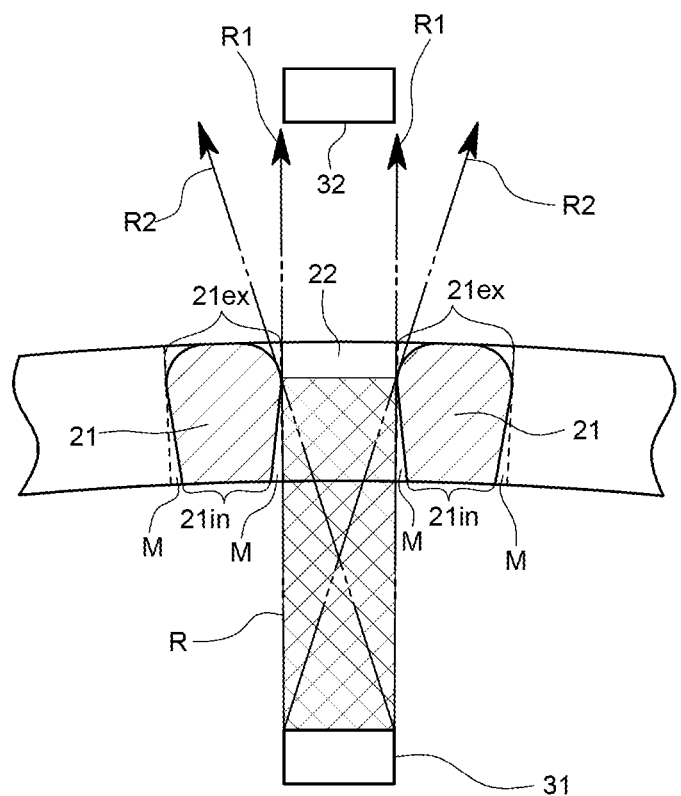
FIG. 11 is a schematic diagram showing a relationship between a light transmittable region and a light blocking portion of a scale for a rotary encoder pertaining to another embodiment of the present invention.

Here, in a state that the light source 31 and the light transmitting portion 22 face-to-face each other as shown in FIG. 11, the light beams R1 among the light beams emitted in parallel from the light source 31 in the radial direction are respectively tangent to the adjacent light blocking portions 21. These two light beams R1 emitted from the light source 31 and progressing in the radial direction are substantially and generally in parallel with each other and an inner peripheral side surface 21 in which is also in a light incident side of the light blocking portion 21 is formed outside than each of the light beams R1. In other words, the margin M is provided by forming the inner peripheral side surface 21 in of the light blocking portion 21 outside than each of the light beams R1.

Meanwhile, in a state that the light source 31 and the light transmitting portion 22 face each other, the light beams R2 are emitted from the light source 31 slanting to the radial direction (i.e., emitted in diagonal line directions) and tangent to the outer peripheral side of the light blocking portions 21. Outer side surfaces 21ex which are light emission sides of the light blocking portion 21 are formed outside of an angle of intersection, which is the smaller one, of these two light beams R2.

Thus, since each of the light blocking portions 21 is formed outside the light transmittable region R as shown in FIG. 11, even if burrs are generated in the inner peripheral side or outer peripheral side, the light is never blocked so long as the burrs are not so large as to enter the light transmittable region R. Therefore, in the case of configuring as a rotary encoder, the resolution is never varied according to existence or absence of burrs and variation among products can be suppressed. In addition, the margin M may be provided in any of the inner peripheral side surface 21 in or outer peripheral side surface 21ex of the light blocking portion 21, and at this time, the light source 31 may be arranged in either of the inside or outside of the scale body 2.

That is, when one of the inner peripheral side surface 21 in or outer peripheral side surface 21ex of the light blocking portion 21 defines the outer edge of the light transmittable region R, it is sufficient that the other of the inner peripheral side surface 21 in or outer peripheral side surface 21ex of the light blocking portion 21 may be formed outside the light transmittable region R.

It is noted that "light blocking" in the present specification is a concept including not only completely blocking light but also allowing a quantity of light to be reduced so as to be only a predetermined passable quantity. In addition, the light transmitting portion may be one capable of passing a quantity of light more than that of the light blocking portion and some quantity of light may be lost.

In addition, needless to say, various changes and combinations of the embodiments may be performed unless being against the scope of the present invention.

INDUSTRIAL APPLICABILITY

According to the present invention, even if burrs are generated, the scale and rotary encoder can be provided with slight variation among the individual productions while keeping high performance such as a resolution and the like without change of light quantity passing through the light transmitting portion.

The invention claimed is:
1. A scale for a rotary encoder comprising;
a scale body which is formed substantially in a cylindrical shape or in a truncated conical shape, the scale body having a light transmitting portion and a light blocking portion at a lateral portion of the scale body, wherein:
the light transmitting portion through which light passes is formed alternately with the light blocking portion in a circumferential direction of the scale body, and
the light blocking portion by which light with a predetermined width in a circumferential direction is blocked, the light blocking portion having an inner side surface and an outer side surface, wherein:
the inner side surface configures an inner portion of the lateral portion of the scale body, and
the outer side surface configures an outer portion of the lateral portion of the scale body, and
a light transmittable region having an outer edge, the outer edge defined by a light beam that runs along a radial direction of the scale body and tangent to the light blocking portion in a lateral cross-section view, wherein
the inner side surface of the light blocking portion or the outer side surface of the light blocking portion is formed outside of the light transmittable region.
2. The scale for the rotary encoder according to claim 1 further comprising a frame part formed with an axial bore to which a rotating shaft is fitted, wherein one end side of the lateral portion of the scale body is connected to the frame part, and a light source and a light detector are provided to be opposed inside and outside across the other end side of the lateral portion of the scale body, wherein
the light blocking portion is formed so as to share a part of each radius inside a first imaginary fan-shape having a first central angle set based on the predetermined width with the center axis as a center point, in a lateral cross-section view, and
as a part of the light blocking portion advances in a radial direction from a side of the light detector toward a side of the light source, a length dimension thereof in the circumferential direction becomes shorter and the part of the light blocking portion is molded of resin so as to be separated inwardly from each radius of the first imaginary fan-shape.
3. The scale for the rotary encoder according to claim 2, wherein the scale body is configured to have the light source provided inside and the light detector provided outside,
the light transmitting portion is an opening formed in the lateral portion of the scale body, and
the light blocking portion is formed so as to share at least a part of each radius inside a second imaginary fan-shape having a second central angle set based on the predetermined width with a placing point of the light source as a center in a state of opposition to the light source, in a lateral cross-section view.

4. The scale for the rotary encoder according to claim 1, wherein the light blocking portion has a column shape in a lateral cross-section view extending from the one end side of the lateral portion of the scale body of a substantially partially annular shape to the other end side, and the outer side surface of the light blocking portion is formed to have a cut-corner shape or rounded-corner shape.

5. The scale for the rotary encoder according to claim 2, wherein the scale body further comprises a rib for connecting the one end side of the light blocking portion with the frame part.

6. The scale for the rotary encoder according to claim 4, wherein the scale body further comprises an annular-shaped balustrade part for respectively connecting the other end sides of a plurality of the light blocking portions.

7. A rotary encoder comprising:
   the scale for the rotary encoder according to claim 1;
   a light source provided inside or outside the scale body; and
   a light detector provided so as to be opposed to the light source across the scale body.

8. A method of injection-molding the scale for the rotary encoder according to claim 1 comprising:
   using a die composed of a cavity formed with at least an outside shape of the light blocking portion and a core formed with at least an inside shape of the light blocking portion, the die being able to split in a central axis direction of the scale body; and
   setting so that the light transmitting portion is formed on a mating surface of the cavity and the core.

* * * * *